US006651992B1

United States Patent
Smith, Sr.

(10) Patent No.: US 6,651,992 B1
(45) Date of Patent: Nov. 25, 2003

(54) CONTAINER WITH INTEGRAL DOLLY

(76) Inventor: Albert Lee Smith, Sr., 412 E. 4th St., P.O. Box 125, Eloy, AZ (US) 85231

( * ) Notice: Subject to any disclaimer, the term of this patent is extended or adjusted under 35 U.S.C. 154(b) by 23 days.

(21) Appl. No.: 09/968,369

(22) Filed: Sep. 30, 2001

Related U.S. Application Data

(60) Provisional application No. 60/237,405, filed on Oct. 2, 2000.

(51) Int. Cl.[7] .................................................. B62B 1/12
(52) U.S. Cl. ............................. 280/47.26; 280/47.315; 280/655.1; 16/113.1
(58) Field of Search ...................... 280/47.26, 43.1, 280/655, 655.1, 47.131, 47.315, 47.371, 79.5, 47.31; 16/113.1, 429; 220/908

(56) References Cited

U.S. PATENT DOCUMENTS

| | | | |
|---|---|---|---|
| 2,409,786 A | * | 10/1946 | Norton ..................... 280/47.26 |
| 2,572,486 A | * | 10/1951 | Isaac ........................ 280/47.26 |
| 3,366,397 A | * | 1/1968 | Zeilstra et al. ........... 280/47.26 |
| 4,135,725 A | * | 1/1979 | DiRoma ................... 280/47.26 |
| D256,423 S | | 8/1980 | Bacskay et al. |
| 4,450,976 A | | 5/1984 | Snyder et al. |
| 4,503,661 A | * | 3/1985 | Potter ...................... 280/47.26 |
| 4,520,921 A | * | 6/1985 | Vissing ....................... 220/306 |
| 4,586,399 A | * | 5/1986 | Kassai ........................ 16/113.1 |
| 4,674,759 A | | 6/1987 | Parker |
| 4,691,840 A | | 9/1987 | Ferbrache |
| 4,759,559 A | | 7/1988 | Moulton |
| 4,807,916 A | * | 2/1989 | Erickson ................... 280/47.26 |
| 4,953,744 A | * | 9/1990 | Koyama ..................... 220/404 |
| 5,000,467 A | | 3/1991 | Becca |
| D318,351 S | | 7/1991 | Wilson |
| D320,103 S | | 9/1991 | Wilson |
| 5,445,398 A | * | 8/1995 | Pierce ..................... 280/47.26 |
| 5,465,844 A | | 11/1995 | Lee |
| 5,511,807 A | | 4/1996 | Snyder |
| 5,625,923 A | * | 5/1997 | Huang ........................ 16/115 |
| 5,636,410 A | * | 6/1997 | Chou ........................ 16/115 |
| 5,704,725 A | * | 1/1998 | Horing ....................... 280/655 |
| 5,758,888 A | | 6/1998 | Burgan et al. |
| 6,036,204 A | * | 3/2000 | Craft et al. ............... 280/47.26 |
| 6,056,301 A | * | 5/2000 | Berliner et al. ........... 280/47.26 |
| 6,148,477 A | * | 11/2000 | Cheng ........................ 16/113.1 |
| 6,223,392 B1 | * | 5/2001 | Chang ....................... 16/113.1 |

* cited by examiner

Primary Examiner—Brian L. Johnson
Assistant Examiner—Jeffrey Restifo
(74) Attorney, Agent, or Firm—John D. Lister

(57) ABSTRACT

A container with an integral dolly includes a container body with a tubular upstanding sidewall that is closed at the bottom and open at the top. A cover, which overlies the open top, can be moved to uncover the opening and gain access to the interior of the container. A vertically extending telescoping handle, that can be adjusted and locked in position at selected heights, is located on the back of the container body for manipulating and moving the container. A pair of wheels is mounted on the lower end and at the back of the container body whereby, when the container body is tilted backwards by the telescoping handle, the container can be wheeled about on the pair of wheels.

3 Claims, 6 Drawing Sheets

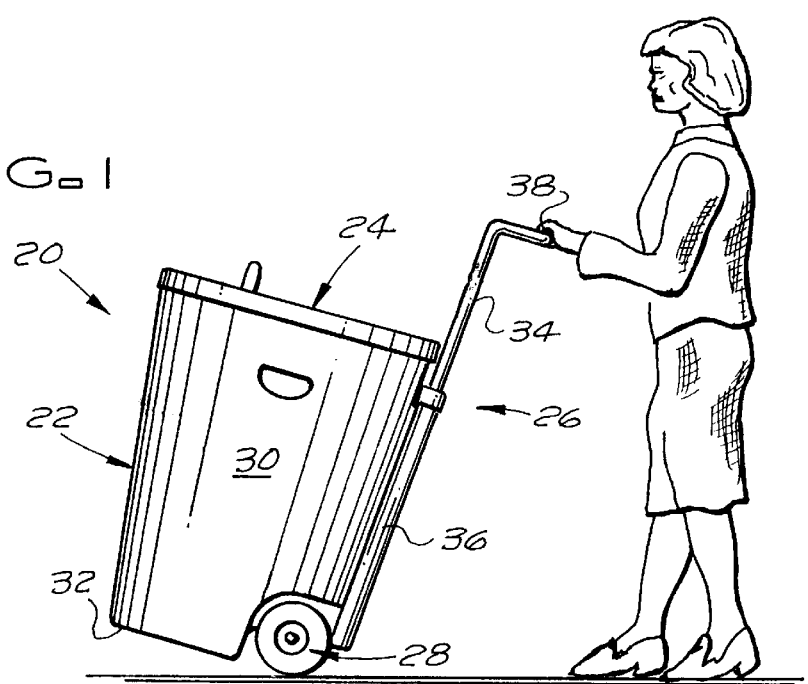
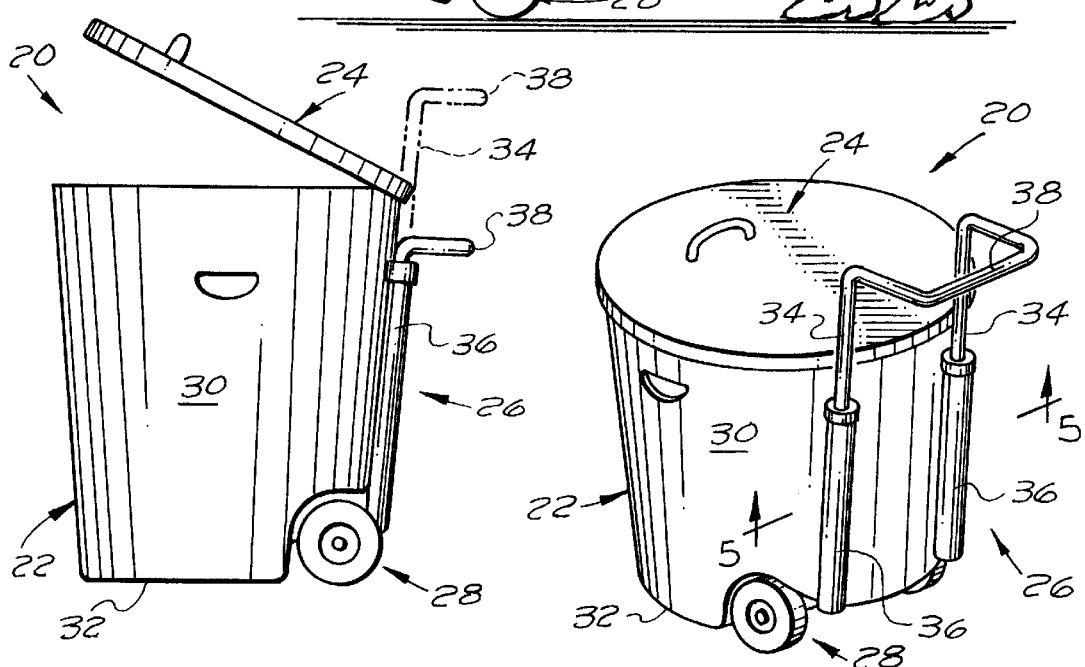
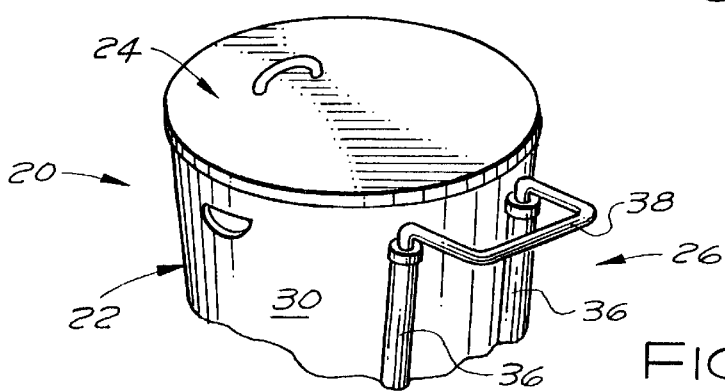
FIG. 1
FIG. 2
FIG. 3
FIG. 4

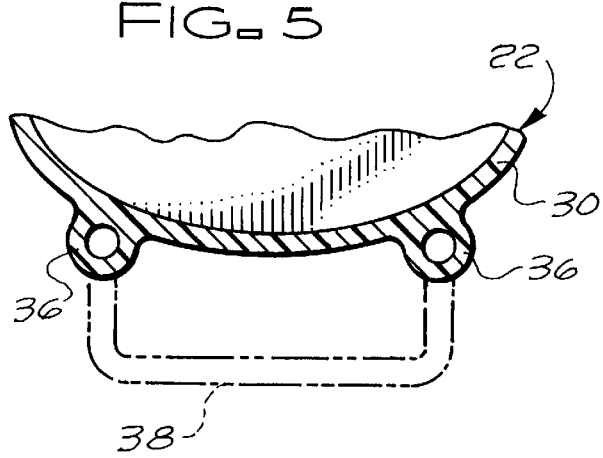
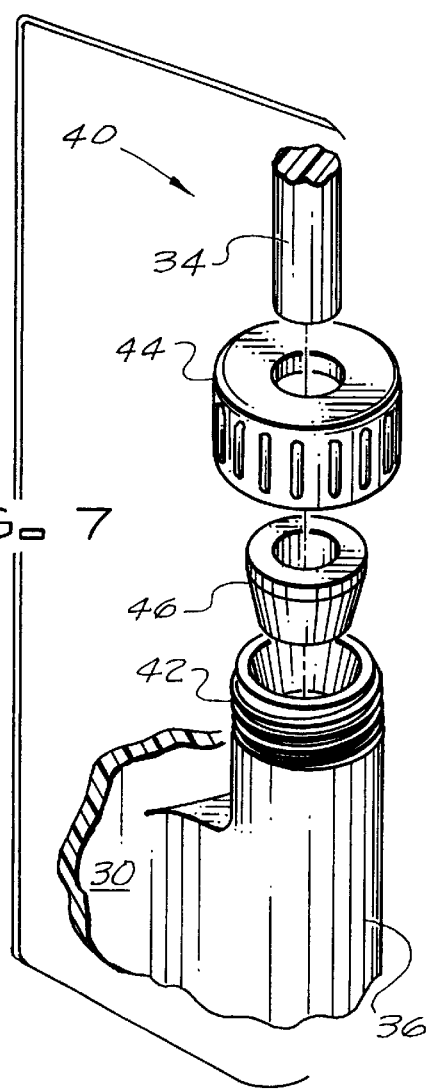
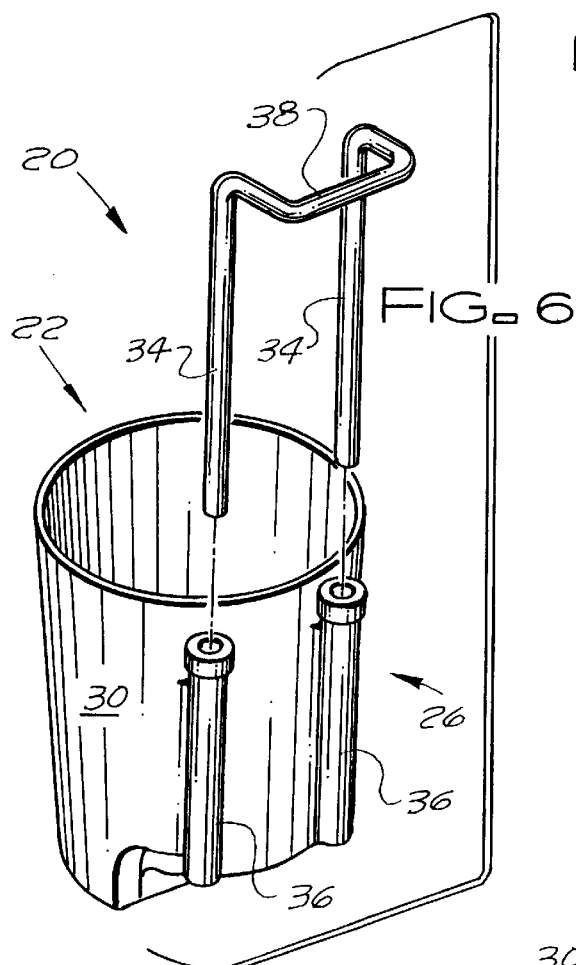
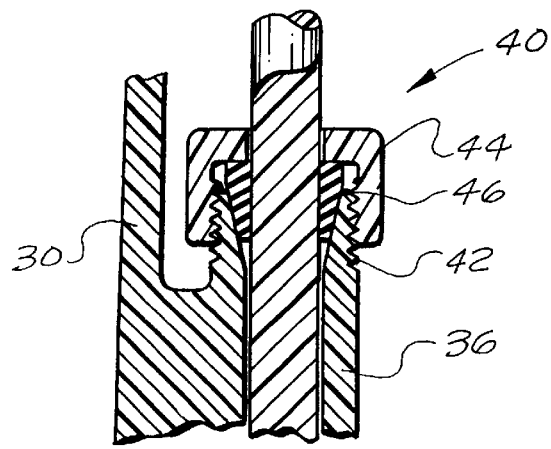

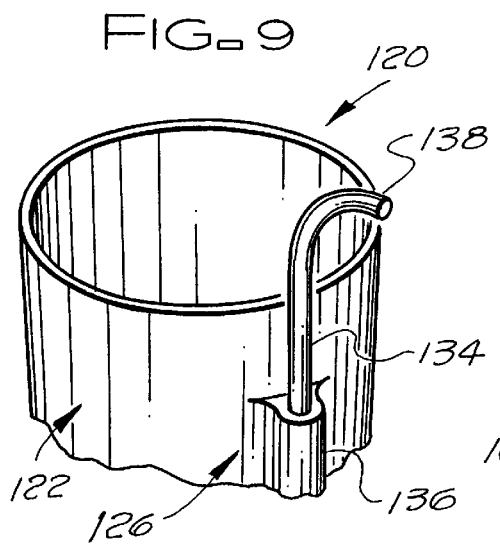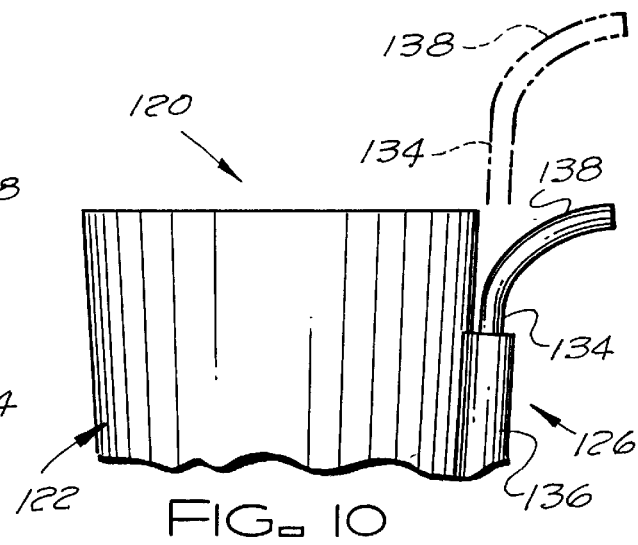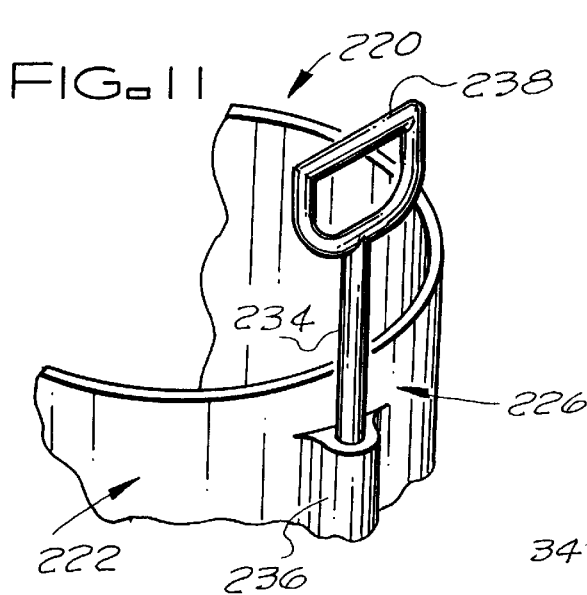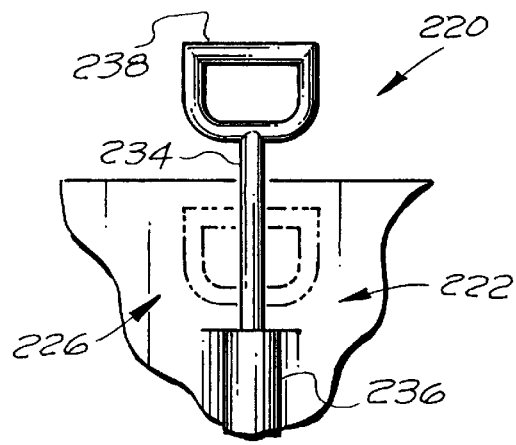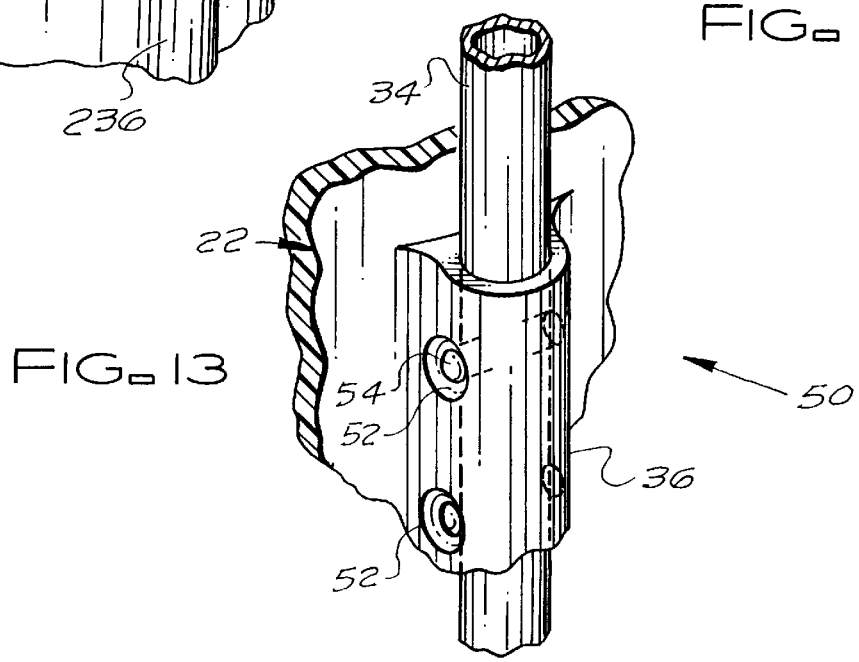

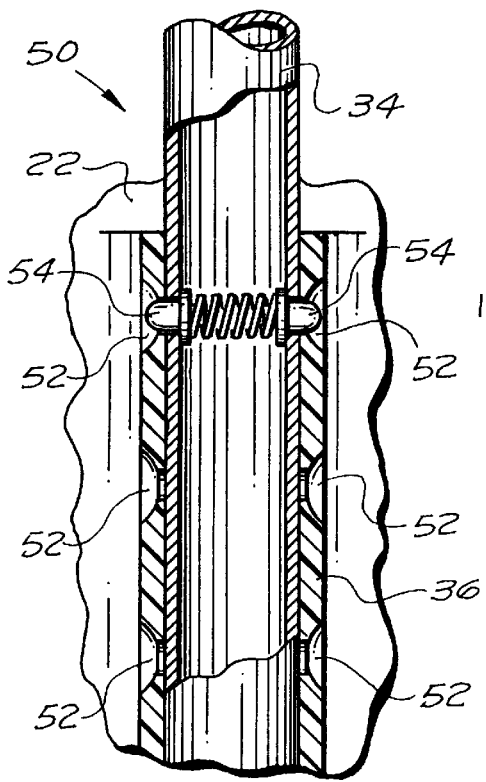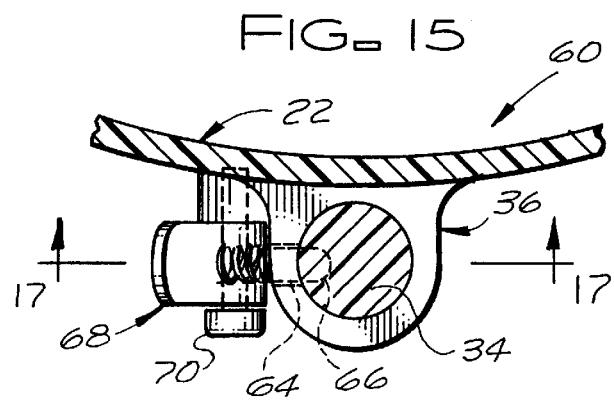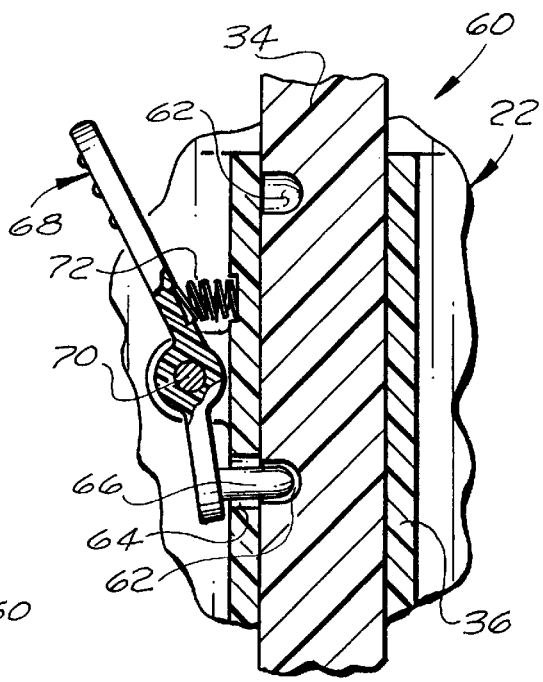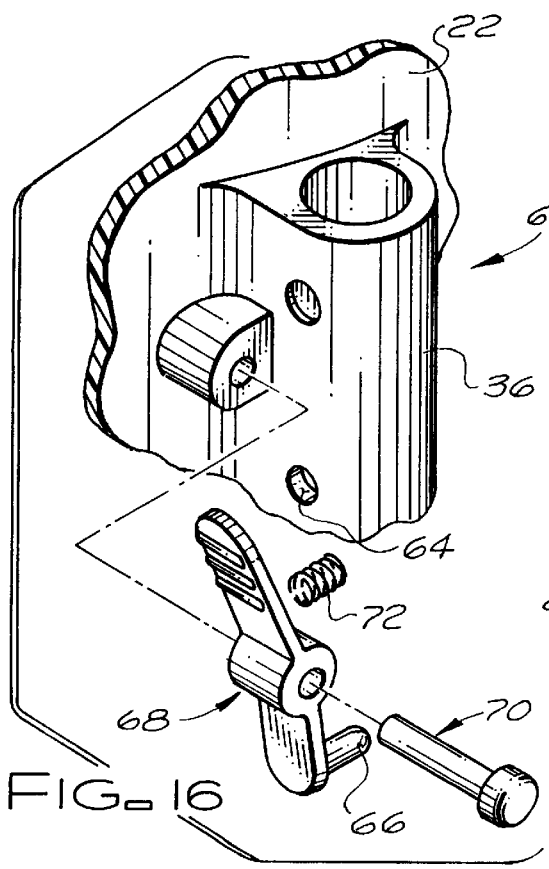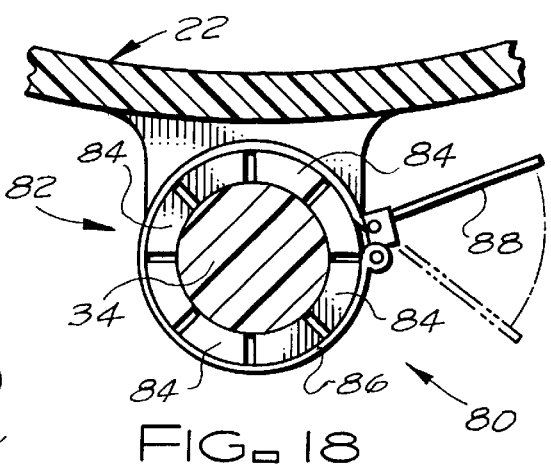

CONTAINER WITH INTEGRAL DOLLY

This patent application is a continuation-in-part of provisional U.S. patent application Ser. No. 60/237,405, filed Oct. 2, 2000.

BACKGROUND OF THE INVENTION

The present invention relates to a container with an integral dolly that is especially well suited as a trash container or a clothes hamper container. The container includes a vertically extending telescoping handle that can be adjusted and locked in position at selected heights for manipulating and moving the container body.

There are numerous trash containers that are mounted on wheels and provided with handles for moving the trash containers about. Examples of such trash containers are disclosed in the following U.S. Pat. Nos. Des. 256,423, issued Aug. 19, 1980; Des. 318,351, issued Jul. 16, 1991; Des. 320,103, issued Sep. 17, 1991; 4,450,976, issued May 29, 1984; 4,674,759, issued Jun. 23, 1987; 4,691,840, issued Sep. 8,1987; 4,759,559, issued Jul. 26, 1988; 5,000,467, issued Mar. 19, 1991; 5,465,844, issued Nov. 14, 1995; and 5,758,888, issued Jun. 2, 1998. Clothes hampers mounted on wheels are also known as exemplified by U.S. Pat. No. 5,511,807, issued Apr. 30, 1996. However, none of these trash containers or clothes hampers have integral telescoping handles thereon that can be selectively adjusted to different heights and locked in position at any of those heights to locate the handle grip at a desired height especially suited for the particular user. Nor do any of these trash containers or clothes hampers enable the handle grip to be located at one height for one user, another height for another user and also to be stored out of the way when not in use.

SUMMARY OF THE INVENTION

The container with an integral dolly of the present invention solves the problems of the prior art. The container of the present invention has an integral telescoping handle thereon that can be selectively adjusted to different heights and locked in position at any of those heights to locate the handle grip at a desired height especially suited for a particular user. With this structure, the handle grip can be located at one height for one user and another height for another user. The handle grip can be located above the top of the container body for better leverage. In addition, when the container is not in use the handle with its handle grip can be stored out of the way.

The container of the present invention includes a container body with a tubular upstanding sidewall that is closed at the bottom and open at the top. A cover, which overlies the open top of the container, can be moved to uncover the opening and gain access to the interior of the container. The vertically extending telescoping handle of the container can be adjusted and locked in position at selected heights and is located on the back of the container body for manipulating and moving the container. A pair of wheels is mounted on the lower end and at the back of the container body whereby, when the container body is tilted backwards by the telescoping handle, the container can be wheeled about on the pair of wheels. The sidewall of and cover for the container body have integral handles thereon to facilitate the handling of the container and its cover. In addition, the container body has a series of spaced apart nipples about the upper edge of the container for securing the cover in place on the container and for securing a trash bag within the container.

BRIEF DESCRIPTION OF THE DRAWINGS

FIG. 1 is a side view of a container of the present invention, with an integral dolly that includes a double telescoping handle, showing a person moving the container.

FIG. 2 is a side view of the container of FIG. 1 showing the telescoping handle in stored and extended positions.

FIG. 3 is a perspective view of the container of FIG. 1 with the double telescoping handle in an extended position.

FIG. 4 is a partial perspective view of the container of FIG. 1 with the double telescoping handle in a stored position.

FIG. 5 is partial cross section through the container of FIG. 1 taken substantially along lines 5—5 of FIG. 4.

FIG. 6 is an exploded partial perspective view of the container of FIG. 1 showing the upper section of the telescoping handle removed from the lower section of the telescoping handle.

FIG. 7 is an exploded perspective view of a first locking mechanism of the present invention that may be used to lock the single or double telescoping handles of the present invention in selected positions.

FIG. 8 is a vertical cross section through the first locking mechanism of FIG. 7.

FIG. 9 is a partial perspective view of a container of the present invention with a first single telescoping handle of the present invention in an extended position.

FIG. 10 is a side view of the container of FIG. 9 with the single telescoping handle in a stored position and extended position.

FIG. 11 is a partial perspective view of a container of the present invention with a second single telescoping handle of the present invention in an extended position.

FIG. 12 is a back view of the container of FIG. 11 with the single telescoping handle in an extended position and a stored position.

FIG. 13 is a perspective view of a second locking mechanism of the present invention that may be used to lock the single or double telescoping handles of the present invention in selected positions.

FIG. 14 is a vertical cross section through the second locking mechanism of FIG. 13.

FIG. 15 is a horizontal cross section through a third locking mechanism of the present invention that may be used to lock the single or double telescoping handles of the present invention is selected positions.

FIG. 16 is an exploded perspective view of a third locking mechanism of FIG. 15.

FIG. 17 is a vertical cross section of the third locking mechanism of FIG. 15 taken substantially along lines 17—17 of FIG. 15.

FIG. 18 is a horizontal cross section through a fourth locking mechanism of the present invention that may be used to lock the single or double telescoping handles of the present invention is selected positions.

DESCRIPTION OF THE PREFERRED EMBODIMENT

Figure 19:
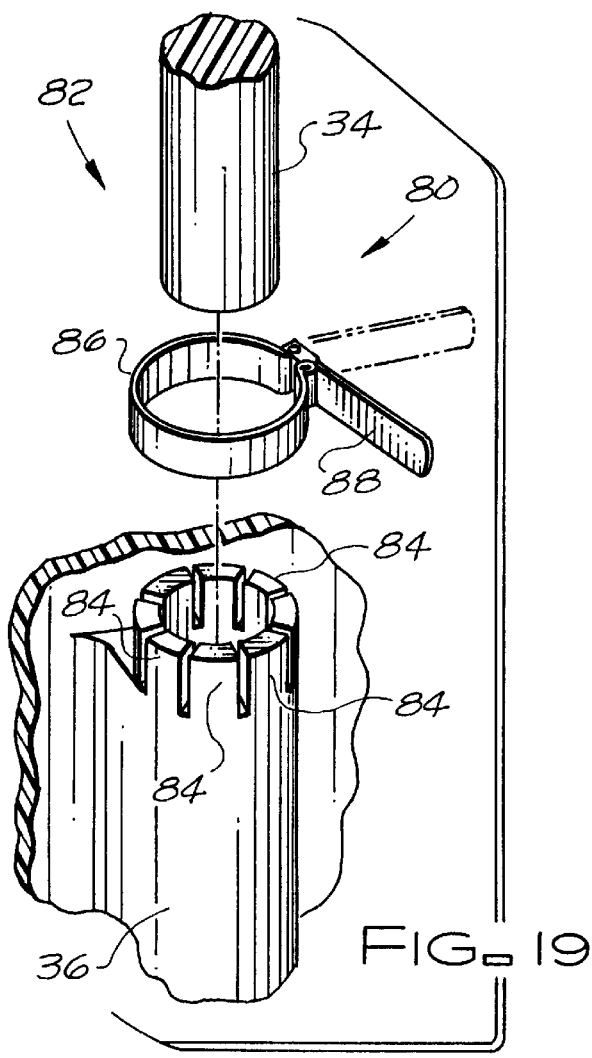
FIG. 19 is an exploded perspective view of the fourth locking mechanism of FIG. 18.
Figure 20:
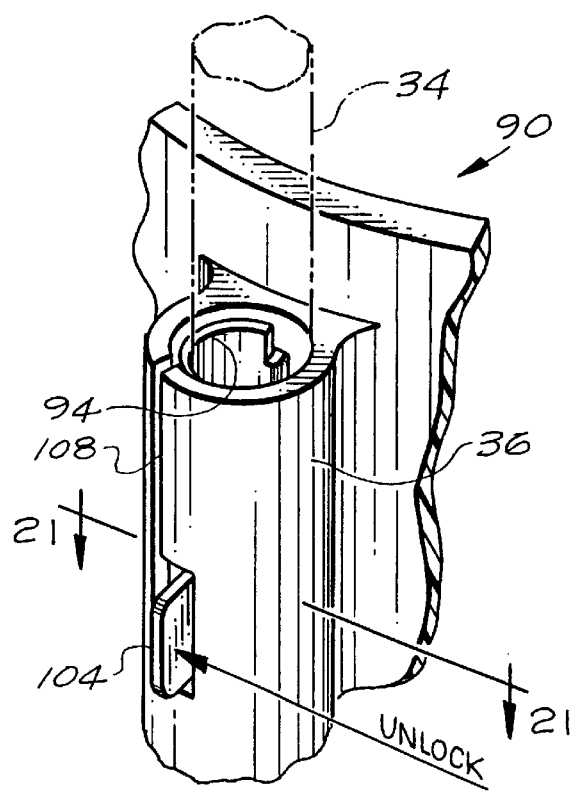
FIG. 20 is a perspective view of a fifth locking mechanism of the present invention that may be used to lock the single or double telescoping handles of the present invention is selected positions.

FIGS. 1 to 6 show a first embodiment of the container with integral dolly of the present invention. The container 20 of FIGS. 1 to 6 includes a container body 22, a cover 24, a telescoping handle 26 and a pair of wheels 28.

The container body 22 has an upstanding tubular sidewall 30 with an open upper end defined by an upper annular edge of the sidewall and a lower end that is closed by an integral bottom wall 32. While the container body 22 shown has a circular horizontal cross section, the container body 22 may have other horizontal cross sectional configurations, such as but not limited to rectangular, square or oval. The cover 24 normally overlies and closes the opening at the upper end of the container body 22 to enclose any contents within the container. However, the cover 24 is movable to uncover the opening in the container body 22 and gain access to the interior of the container body for depositing materials into or removing materials from within the container body. While as shown the cover 24 is completely separable from the container body 22, it is contemplated that the cover 24 may be pivotally connected on one side to the upper edge of the container body sidewall 30 by one or more hinges. The two of wheels 28 are rotatably mounted on an axle to the lower end of the container body 22 at the back of the container body whereby when the container 20 is tilted backwards by the telescoping double handle 26 the container 20 can be wheeled about on the pair of wheels.

Preferably, the container body 22 and the cover 24 are made of a molded resilient polymeric material such as but not limited to polyethylene or another high-density, cross-linkable polyolefin. The container 20 may be made in different colors suitable for a particular application, e.g. for use as a trash receptacle the container might be gray, black or green, etc., for use as a clothes hamper the container 20 might be white, beige, pink, etc.

The container 20 includes a vertically extending telescoping double handle 26 that is located on the back of the container body 22. The telescoping double handle 26 is used for manipulating and moving the container 20. The telescoping double handle 26 includes a pair of extensible rods 34 that each has an upper end and a lower portion. The telescoping double handle 26 also includes a pair of vertically extending tubular sleeves 36 that are integral with (molded into) the upstanding tubular sidewall 30 of the container body 22. The upper ends of the extensible rods 34 are connected together by a cross bar or rod portion that forms a grip 38 that is gripped by a user to manipulate and move the container 20. The lower portion of the extensible rods 34 are slidably received within the tubular sleeves 36 whereby the extensible rods 34 can be moved vertically relative to the tubular sleeves 36 and the container body 22 to locate the grip 38 at a desired height for gripping by a user. The extensible rods 34 and cross bar forming the grip 38 may be made of a molded polymeric material such as but not limited to polyethylene or another high-density, cross-linkable polyolefin or a metal, such as but not limited to stainless steel or aluminum.

The telescoping double handle 26 also has at least one releasable locking mechanism: for locking the extensible rods 34 in place with the grip 38 at a selected height prior to using the telescoping double handle 26 to manipulate and move the container 20; for unlocking the extensible rods to permit the extensible rods 34 to be readjusted to a different height and/or slid down into the tubular sleeves 36 to store the telescoping double handle 26 out of the way when not in use; and for relocking the extensible rods in any readjusted or stored position.

There are several preferred releasable locking mechanisms for locking the extensible rods 34 in place at selected heights that will be discussed in detail below. The first such releasable locking mechanism 40 is shown in FIGS. 7 and 8. The releasable locking mechanism 40 includes: one of the extensible rods 34; an upper threaded end portion 42 of one of the tubular sleeves 36; a threaded collar 44; and a resilient locking sleeve 46. The resilient locking sleeve 46 is made of rubber or another polymeric material. The resilient locking sleeve is carried on the extensible rod 34 and within the upper end of the tubular sleeve 36. When the threaded collar 44 is loosened by at least partially unthreading the collar 44 from the threaded end portion 42 of the tubular sleeve 36, the extensible rod 34 can be slid upward or downward through the resilient locking sleeve 46 to adjust the height of the handle grip 38. When the threaded collar 44 is tightened by threading the collar 44 further onto the threaded end portion 42 of the tubular sleeve 36, the resilient locking sleeve 46 is forced down between the tapered inside wall of the tubular sleeve 36 and the outer surface of the extensible rod 34 to grip the extensible rod and lock the rod in position as shown in FIG. 8. While it is contemplated that only one releasable locking mechanism 40 is required to lock the telescoping double handle 26 in place, if desired, a releasable locking mechanism 40 may be used on each of the extensible rods 34. The locking mechanism 40 may also be utilized on the telescoping single handles 126 and 226 of FIGS. 9 to 12.

FIGS. 9 and 10 show a second embodiment of the container with integral dolly of the present invention. The container 120 of FIGS. 9 and 10 includes a container body 122, a cover (not shown), a telescoping handle 126, and a pair of wheels (not shown). The container 120 is the same as the container 20 with the following exceptions: the telescoping handle 126 is a telescoping single handle with a single extensible rod 134 slidably carried in a single vertically extending tubular sleeve 136. The single tubular sleeve 136 is molded into and centered on the back of the container body 122 and the grip 138 at the upper end of the extensible rod has a curved shape like a typical vacuum cleaner grip. The releasable locking mechanism 40 may be used to releasably lock the extensible rod 134 in place in the manner described above in connection with the extensible rod 34 of the telescoping double handle 26 or one of the other locking mechanisms shown in FIGS. 13 to 23 may be used to releasably lock the extensible rod 134 in place.

FIGS. 11 and 12 show a third embodiment of the container with integral dolly of the present invention. The container 220 of FIGS. 11 and 12 includes a container body 222, a cover (not shown), a telescoping handle 226, and a pair of wheels (not shown). The container 220 is the same, as the container 20 with the following exceptions: the telescoping handle 226 is a telescoping single handle with a single extensible rod 234 slidably carried in a single vertically extending tubular sleeve 236. The single tubular sleeve 236 is molded into and centered on the back of the container body 222 and the grip 238 at the upper end of the extensible rod 234 is shaped like a shovel handle. The releasable locking mechanism 40 may be used to releasably lock the extensible rod 234 in place in the manner described above in connection with the extensible rod 34 of the telescoping double handle 26 or one of the other locking mechanisms shown in FIGS. 13 to 23 may be used to releasably lock the extensible rod 234 in place.

A second releasable locking mechanism 50 is shown in FIGS. 13 and 14. While the second releasable locking mechanism 50 is described in connection with the container with integral dolly 20 of FIGS. 1–6, the second releasable locking mechanism may also be used the containers with integral dollys 120 and 220 of FIGS. 9 to 12. As shown, the releasable locking mechanism 50 includes: the extensible rod 34 which is tubular; a series of pairs 52 of vertically spaced apart diametrically opposed holes in and along substantially the entire length of the tubular sleeve 36; and a pair of spring-biased or spring-loaded pins 54 mounted in the extensible rod 34. While the vertical spacing between successive pairs 52 of the vertically spaced apart holes in and along the length of the tubular sleeve may vary, typically, the spacing will be in a range of between one inch and three inches. When a person pushes the spring-loaded pins 54 back into the extensible rod 34 with his/her fingers, the extensible rod 34 can be slid upward or downward relative to the tubular sleeve 36 until the spring-loaded pins are aligned with the next set of holes 52. When the spring-biased pins are aligned with the next set of holes 52 the spring 56 will extend the pins 54 into the holes 52 to lock the telescoping handle in place. This procedure can be followed until the telescoping handle is adjusted upward or downward to a desired height for the handle grip 38. While it is contemplated that only one releasable locking mechanism 50 is required to lock the telescoping double handle 26 in place, if desired, a releasable locking mechanism 50 may be used on each of the extensible rods 34.

A third releasable locking mechanism 60 is shown in FIGS. 15, 16 and 17. While the third releasable locking mechanism 60 is described in connection with the container with integral dolly 20 of FIGS. 1–6, the second releasable locking mechanism may also be used the containers with integral dollys 120 and 220 of FIGS. 9 to 12. As shown, the releasable locking mechanism 60 includes: the extensible rod 34 with a series of vertically spaced apart holes 62 in and along substantially the entire length of the extensible rod; a hole 64 in the tubular sleeve 36 opposite the series of holes 62 in the extensible rod; and a spring-loaded pin 66 mounted on the tubular sleeve. While the vertical spacing between successive holes 62 of the vertically spaced apart holes in and along the length of the extensible rod may vary, typically, the spacing will be in a range of between one inch and three inches. The spring-loaded pin 66 is an integral part of a rocker arm 68 that is pivotally secured by a pivot pin 70 to the outside of the tubular sleeve. A first end of the rocker arm 68 on a first side of the pivot pin 70 is urged outward by a coil spring 72. When the first end of the rocker arm 68 is not depressed by a user, the second end of the rocker arm 68, which includes the pin 66, is urged inwardly by the spring 72 with the pin 66 extending through the hole 64 in the tubular sleeve and into one of the series of holes 62 in the extensible rod to lock the extensible rod in place. When someone depresses the first end of the rocker arm 68, the rocker arm 68 pivots about the pivot pin 70 and the pin 66 comes out of engagement with a hole in the extensible rod 34 to unlock the extensible rod. The extensible rod can then be slid upward or downward relative to the tubular sleeve 36 until at a desired height for the handle grip another of the holes in the series of holes 62 is aligned with the hole 64 in the tubular sleeve and the pin 66. The rocker arm 68 is then released and the rocker arm pivots under the action of the spring 72 to urge the pin 66 into the newly selected hole to lock the extensible rod in place with the grip at this new height.

A fourth releasable locking mechanism 80 is shown in FIGS. 18 and 19. While the fourth releasable locking mechanism 80 is described in connection with the container with integral dolly 20 of FIGS. 1–6, the second releasable locking mechanism may also be used the containers with integral dollys 120 and 220 of FIGS. 9 to 12. As shown, the releasable locking mechanism 80 includes: the extensible rod 34; an upper end portion of the tubular sleeve 36; and a clamping mechanism 82. The upper end portion of the tubular sleeve is formed of a series of circumferentially spaced apart vertically extending flexible or resilient projections 84. The clamping mechanism 82 includes a strap 86 that is wrapped about these vertically extending projections 84 and a lever arm 88 that is pivotally mounted to one end of the strap 86 and connected to the other end of the strap 86 at a location spaced from the pivotal connection. The clamping mechanism 82 functions like a conventional oil filter strap wrench. When the lever arm 88 is in the position shown in phantom line in FIGS. 18 and 19, the strap 86 is loosely wrapped about the vertically extending projections 84 of the tubular sleeve and the extension rod can be slid vertically up or down to adjust the height of the telescoping handle grip. When the lever arm is pivoted about its fulcrum to the position shown in solid line in FIGS. 18 and 19, the strap 86 is tightened about the vertically extending projections 84. As the strap 86 is tightened about the vertically extending projections 84, the projections 84 are forced radially inward and grip the exterior surface of the extensible rod to lock the extensible rod in place with the grip of telescoping handle at the desired height.

Figure 21:
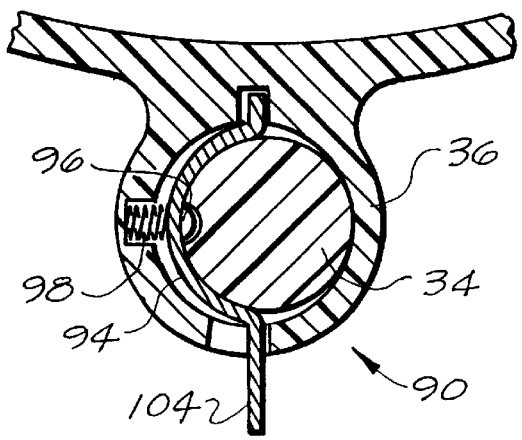
FIGS. 21 and 22 are horizontal cross sections through the fifth locking mechanism of FIG. 20 showing toe locking mechanism in a locked position and an unlocked position.
Figure 22:
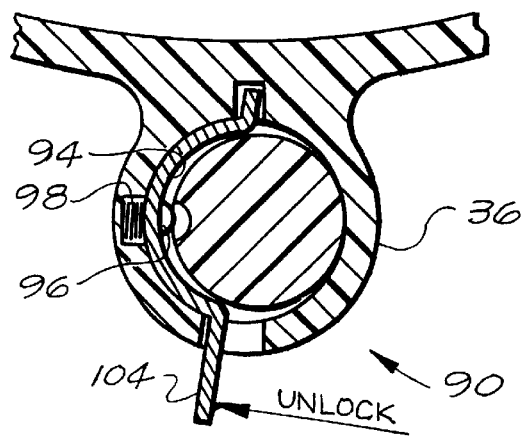
Figure 23:
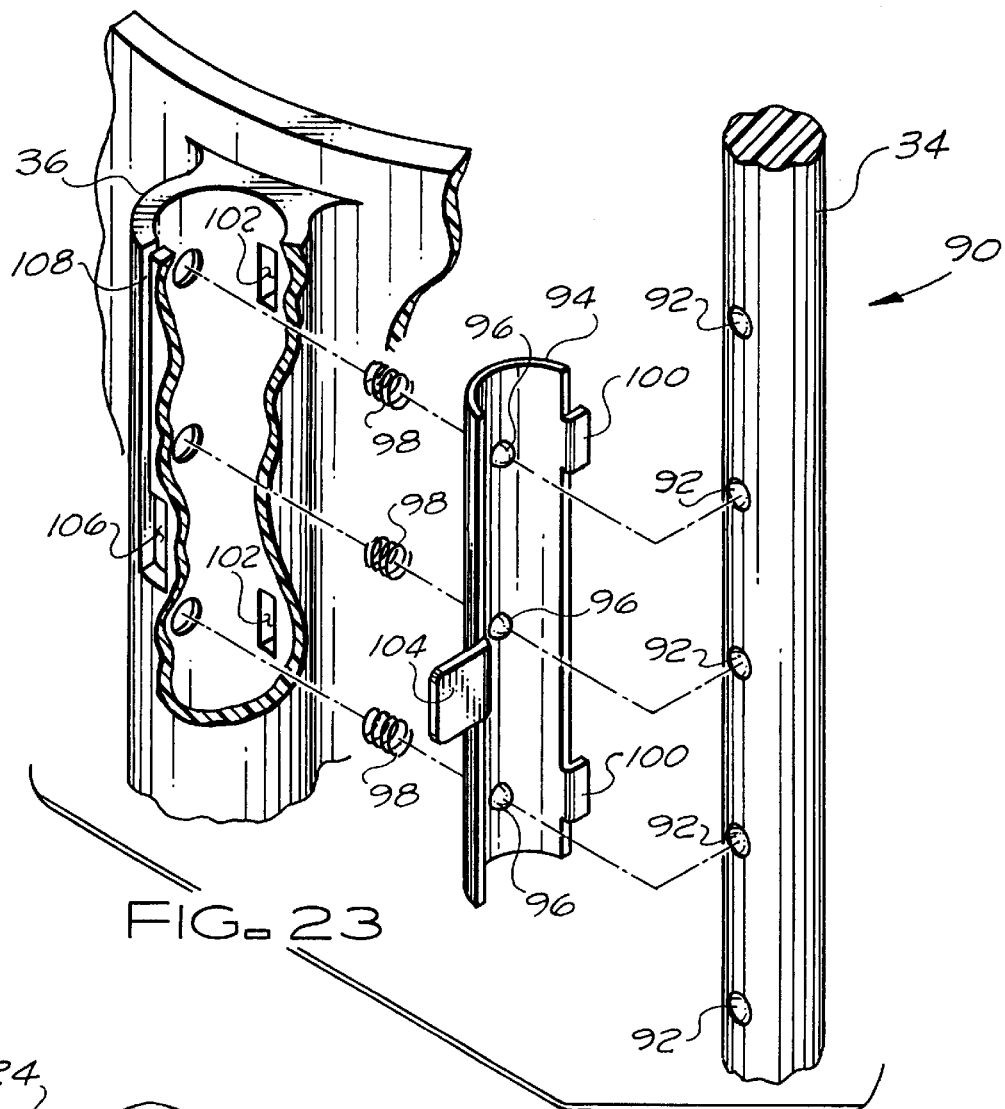
FIG. 23 is an exploded perspective view of the fifth locking mechanism of FIG. 20.

A fifth releasable locking mechanism 90 is shown in FIGS. 20 to 23. While the fifth releasable locking mechanism 90 is described in connection with the container with integral dolly 20 of FIGS. 1–6, the second releasable locking mechanism may also be used the containers with integral dollys 120 and 220 of FIGS. 9 to 12. As shown, the releasable locking mechanism 90 includes: the extensible rod 34 with a series of vertically spaced apart holes 92 therein; the tubular sleeve 36; and a vertically extending spring-loaded plate 94 mounted with the tubular sleeve intermediate one side of the extensible rod and the tubular sleeve. The spring-loaded plate 94 has a series of integral spaced apart pins 96 that project toward and are normally urged into some of the holes 92 in the extensible rod to lock the extensible rod in place with the grip of the telescoping handle at a selected height. The springs 98 that urge the pins into the holes of the extensible rod are mounted within the tubular sleeve intermediate the plate 94 and the interior sidewall of the tubular sleeve. A first end of each of the springs 98 is mounted within a depression in the interior sidewall of the tubular sleeve and an opposite end of each spring is mounted within an opposed depression in the plate 94 to urge the pins 96 on the plate 94 into the holes 92 in the extensible rod. The pins 96 on the plate 94 are spaced apart the same distance at the holes 92 in the extensible rod. The plate 94 has a pair of tabs 100 that are received in slots 102 of the tubular sleeve and a finger tab 104 that extends out through a slot 106 of the tubular sleeve. When the finger tab 104 is pushed to the left, to the position shown in FIG. 22, the plate 94 pivots about the tabs 100 in the slots 102 to unlock the extensible rod by removing the pins 96 from the holes 92 in the extensible rod. When the finger tab 104 is released, the springs 98 pivot the plate 94 with its integral pins 96 toward the extensible rod to insert the pins on the plate 94 into aligned holes 92 on the extensible rod as shown in FIG. 21 to lock the rod in place at a desired height. Preferably, the plate 94 can be flexed to insert the plate down into the tubular sleeve. In addition the tubular sleeve may have a slot 108 extending upward from the slot 106 through which the finger tab can be inserted into the slot 106.

As an alternative to the locking mechanism 90 shown in FIGS. 20 to 23, it is contemplated that the locking mechanism 90 could include: the extensible rods 34 with a series of vertically spaced apart integral pins projecting from a first side of the rod; the tubular sleeve 36 with a series of vertically spaced apart holes therein opposite the pins in the extensible rod; and a vertically extending spring-loaded plate mounted within the tubular sleeve, in the same manner as plate 94, intermediate the opposite side of the extensible rod and the tubular sleeve. With this arrangement the spring loaded plate urges the pins of the extensible rod into the holes in the tubular sleeve to lock the extensible rod in place and moving the finger tab to the left to a position such as that shown in FIG. 22, removes the pins from the holes in the tubular sleeve so that the rod can be slid up or down within the tubular sleeve to adjust the height of the grip of the telescoping handle.

Figure 24:
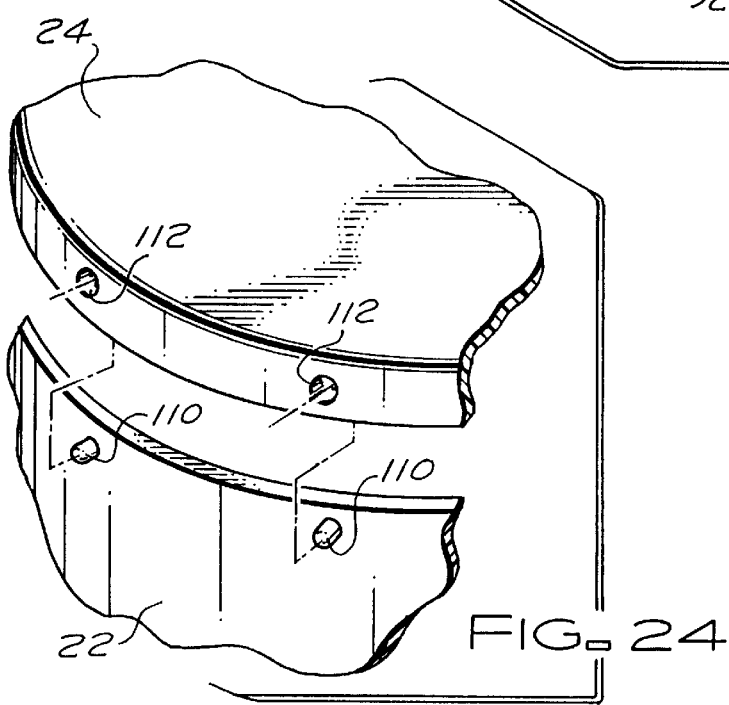
FIG. 24 is a partial perspective view of an upper portion of the container body and a portion of the container cover.
Figure 25:
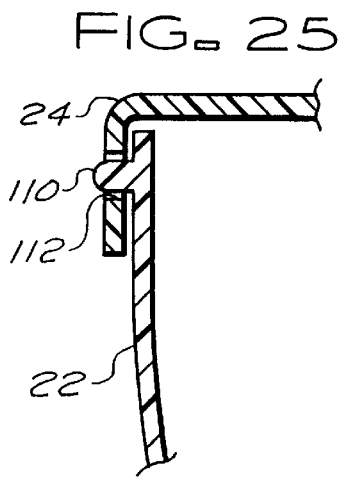
FIG. 25 is a vertical cross section through an upper portion of the container body and the container cover with the cover secured in place on the container body.

FIGS. 24 and 25 show a preferred manner of removably locking the container cover 24 onto the container body 22. The upper edge portion of the container body 22 has a series of circumferentially spaced-apart pins 110 projecting radially outward from the container body. The container cover 24, which is made of a resilient material, has a series of circumferentially spaced-apart holes 112 therein. These holes 112 are spaced-apart the same distance as the pins 110 in the container body and when the cover 24 is placed over the opening in the container body 22, the holes 112 in the cover 24 are snapped in place over the pins 110 to lock the cover in place. To remove the cover 24 the holes 112 are unsnapped from the pins. The pins 110 can also be used to hold the upper edge of a trash bag in place.

Typical dimensions of the container 20, 120 or 220 are as follows: overall height about 2½ feet to about 3 feet; diameter about 1¾ feet to about 2¼ feet; and height adjustment of the telescoping handle 26, 126 or 226 about 1 foot to about 1½ feet. Typically, the handle grip can be moved from a stored position about 4 to 6 inches below the upper rim of the container body to a fully extended position about 8 to 12 inches above the upper rim of the container body. In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, the extensible rods could be in several sections functioning like a periscope mechanism. Thus, the invention is not intended to be limited to the specific embodiments disclosed, but is to be limited only by the claims appended hereto.

What is claimed is:

1. A trash container with an integral dolly, comprising:
   a container body having an upper end and a lower end; the container body having a front and a back; the container body having an upstanding tubular sidewall; the container body having a bottom wall integral with and closing a bottom of the tubular sidewall; the tubular sidewall having an upper edge defining an opening into an interior of the container body; the container body having a resilient cover that overlies and closes the opening; the resilient cover being removable to uncover the opening in the container body and gain access to the interior of the container body for depositing materials into or removing materials from within the container body; the container body having series of circumferentially spaced-apart pins adjacent the upper end of the container body: and the resilient cover having a series of circumferentially spaced-apart holes therein that snap onto and off of the circumferentially spaced-apart pins adjacent the upper end of the container body for removably locking the resilient cover on the container body;
   a vertically extending telescoping handle means centrally located on the back of the container body for manipulating and moving the container body; the telescoping handle means having a single extensible rod with an upper end and a lower portion; the telescoping handle means having a single vertically extending tubular sleeve integral with the upstanding tubular sidewall of the container body; the upper end of the extensible rod having a grip means for gripping by a user; the lower portion of the extensible rod being slidably received in the tubular sleeve whereby the extensible rod can be moved vertically relative to the tubular sleeve and the container body to locate the grip means at a selected height for gripping by a user, the telescoping handle means having releasable locking means for locking the extensible rod in place with the grip means at the selected height prior to using the telescoping handle means to manipulate and move the container and for unlocking the extensible rod to permit the extensible rod to be adjusted in height and slid down into the tubular sleeve to store the telescoping handle means out of the way when not in use; the releasable locking means comprising a series of vertically spaced apart holes in the lower portion of the extensible rod and a spring loaded rocker arm pivotally mounted intermediate a first end and a second end of the rocker arm on an upper portion of the tubular sleeve; the tubular sleeve having a hole therein, and the spring loaded rocker arm means having a pin that extends by spring action through the hole in the tubular sleeve and into a selected hole in the lower portion of the extensible rod to lock the extensible rod in place and that can be retracted against the spring action from the hole in the extensible rod by depressing the first end of the rocker arm inward toward the tubular sleeve to permit vertical sliding movement of the extensible rod relative to the tubular sleeve; and
   a pair of wheels mounted to the lower end of the container body at the back of the container body whereby when the container is tilted backwards by the telescoping handle means, the container can be wheeled about on the pair of wheels.

2. The container according to claim 1, wherein:
   the grip means at the top end of the rod means is a D-shaped grip.

3. A trash container with an integral dolly, comprising:
   a container body having an upper end and a lower end; the container body having a front and a back; the container body having an upstanding tubular sidewall; the container body having a bottom wall integral with and closing a bottom of the tubular sidewall; the tubular sidewall having an upper edge defining an opening into an interior of the container body; the container body having a resilient cover that overlies and closes the opening; the resilient cover being removable to uncover the opening in the container body and gain access to the interior of the container body for depositing materials into or removing materials from within the container body; the container body having a series of circumferentially spaced-apart pins adjacent the upper end of the container body; and the resilient cover having a series of circumferentially spaced-apart holes therein that snap onto and off of the circumferentially spaced-part pins adjacent the upper end of the container body for removably locking the resilient cover on the container body;

a vertically extending telescoping handle means on the back of the container body for manipulating and moving the container body; the telescoping handle means having first and second spaced apart vertically extending tubular sleeves integral with the upstanding tubular sidewall of the container body; the telescoping handle means having first and second extensible rods that each have an upper end and a lower portion; the upper ends of the extensible rods being joined by a cross member grip for gripping by a user; the lower portions of the extensible rods being slidably received in the first and second tubular sleeves whereby the first and second extensible rods can be moved vertically relative to the first and second tubular sleeves and the container body to locate the cross member grip at a selected height for gripping by a user; the telescoping handle means having releasable locking means for locking the first and second extensible rods in place with the cross member grip at the selected height prior to using the telescoping handle means to manipulate and move the container and for unlocking the first and second extensible rods to permit the first and second extensible rods to be adjusted in height and slid down into the first and second tubular sleeves to store the telescoping handle means out of the way when not in use; the releasable locking means comprising a series of vertically spaced apart holes in the lower portion of the first extensible rod and a spring loaded rocker arm pivotally mounted intermediate a first end and a second end of the rocker arm on an upper portion of the first tubular sleeve; the first tubular sleeve having a hole therein; and the spring loaded racker arm having a pin on the second end that extends by spring action through the hole in the first tubular sleeve and into a selected hole in the lower portion of the first extensible rod to lock the first extensible rod in place and that can be retracted against the spring action from the hole in the first extensible rod by depressing the first end of the rocker arm inward toward the first tubular sleeve to permit vertical sliding movement of the first and second extensible rods relative to the first and second tubular sleeves; and a pair of wheels mounted to the lower end of the container body at the back of the container body whereby when the container is tilted backwards by the telescoping handle means, the container can be wheeled about on the pair of wheels.

* * * * *